United States Patent [19]
Yoshida

[11] Patent Number: 5,630,111
[45] Date of Patent: May 13, 1997

[54] PROCESSING AND PLAYBACK APPARATUS FOR RECORDED DIGITAL DATA

[75] Inventor: Takuji Yoshida, Yokohama, Japan

[73] Assignee: Kabushiki Kaisha Toshiba, Kawasaki, Japan

[21] Appl. No.: 498,794

[22] Filed: Jul. 5, 1995

Related U.S. Application Data

[63] Continuation of Ser. No. 971,961, Apr. 16, 1993, abandoned.

[30] Foreign Application Priority Data

Jun. 17, 1991 [JP] Japan .................................. 3-144513

[51] Int. Cl.$^6$ .................................................. G06F 1/14
[52] U.S. Cl. ................................ 395/550; 395/880
[58] Field of Search ................................ 395/250, 849, 395/872, 873, 877, 878, 880, 550

[56] References Cited

U.S. PATENT DOCUMENTS

| | | | |
|---|---|---|---|
| 4,413,289 | 11/1983 | Weaver et al. | 360/51 |
| 4,802,152 | 1/1989 | Markvoort et al. | 369/32 |
| 4,872,073 | 10/1989 | Fincher et al. | 360/51 |
| 5,291,468 | 3/1994 | Carmon et al. | 369/47 |

FOREIGN PATENT DOCUMENTS

| | | |
|---|---|---|
| 1-130223 | 5/1989 | Japan . |
| 1-316820 | 12/1989 | Japan . |
| 2-62762 | 3/1990 | Japan . |

*Primary Examiner*—Thomas M. Heckler
*Assistant Examiner*—Dennis M. Butler
*Attorney, Agent, or Firm*—Cushman Darby & Cushman, IP Group of Pillsbury Madison & Sutro LP

[57] ABSTRACT

The present invention relates to a digital data processing apparatus for transferring digital data which is output from a disc reproduction section to a buffer memory-equipped host processing section and for performing processing. The range over which the frequency of an operation clock in the disc reproduction section is shifted under an ambient condition is set to be higher than the range over which the frequency of an operation clock in the host processing section is shifted under the ambient condition. The storage capacity of the memory is set to be greater than a maximum amount of unprocessed data accumulated in the memory which is calculated from the frequency shifts of both the operation clocks and maximum data of the disc reproduction section, whereby the memory is prevented from being placed in an over- or an underflowed state and a normal data reproduction can be achieved.

6 Claims, 3 Drawing Sheets

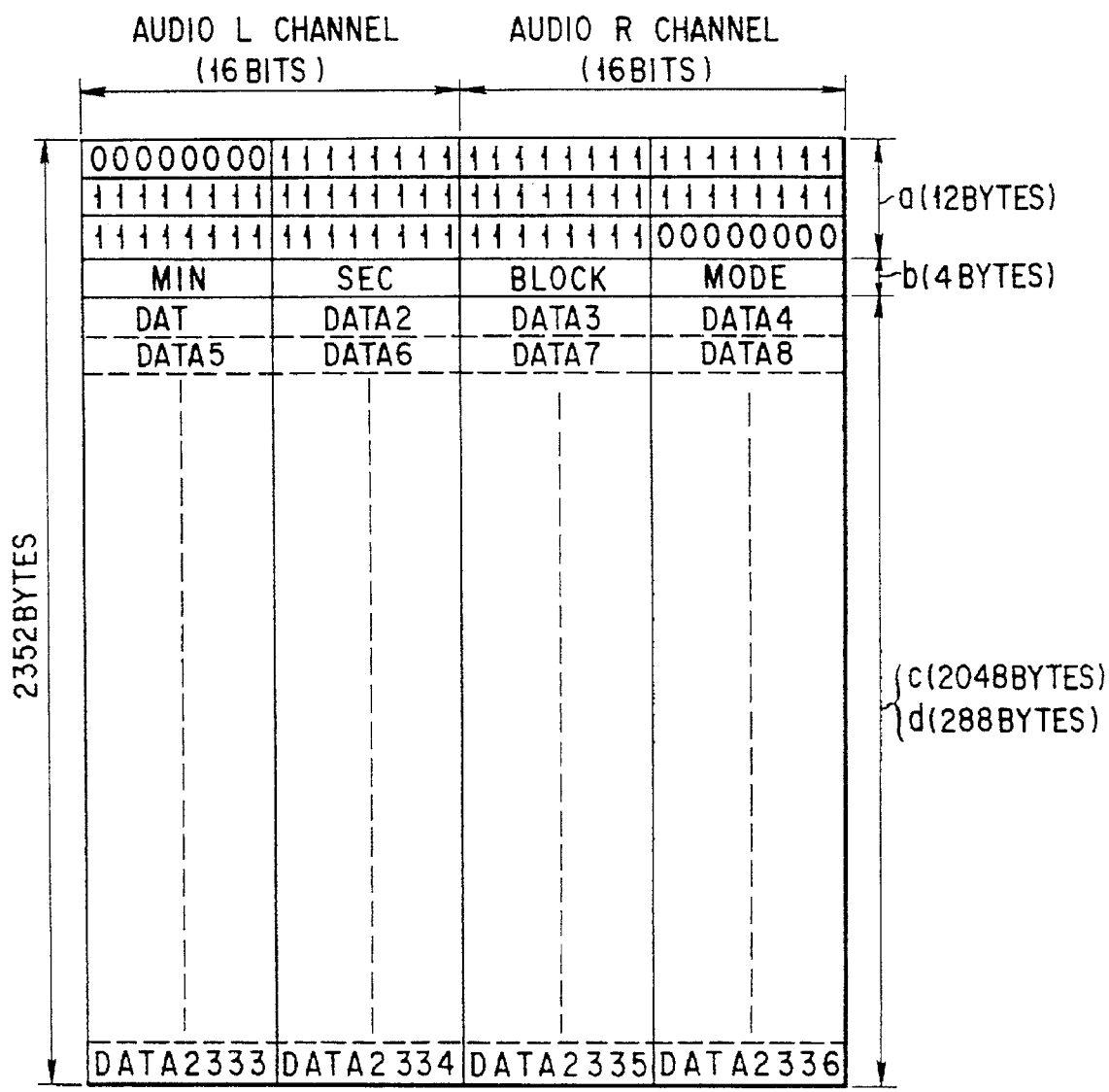
F I G. 1

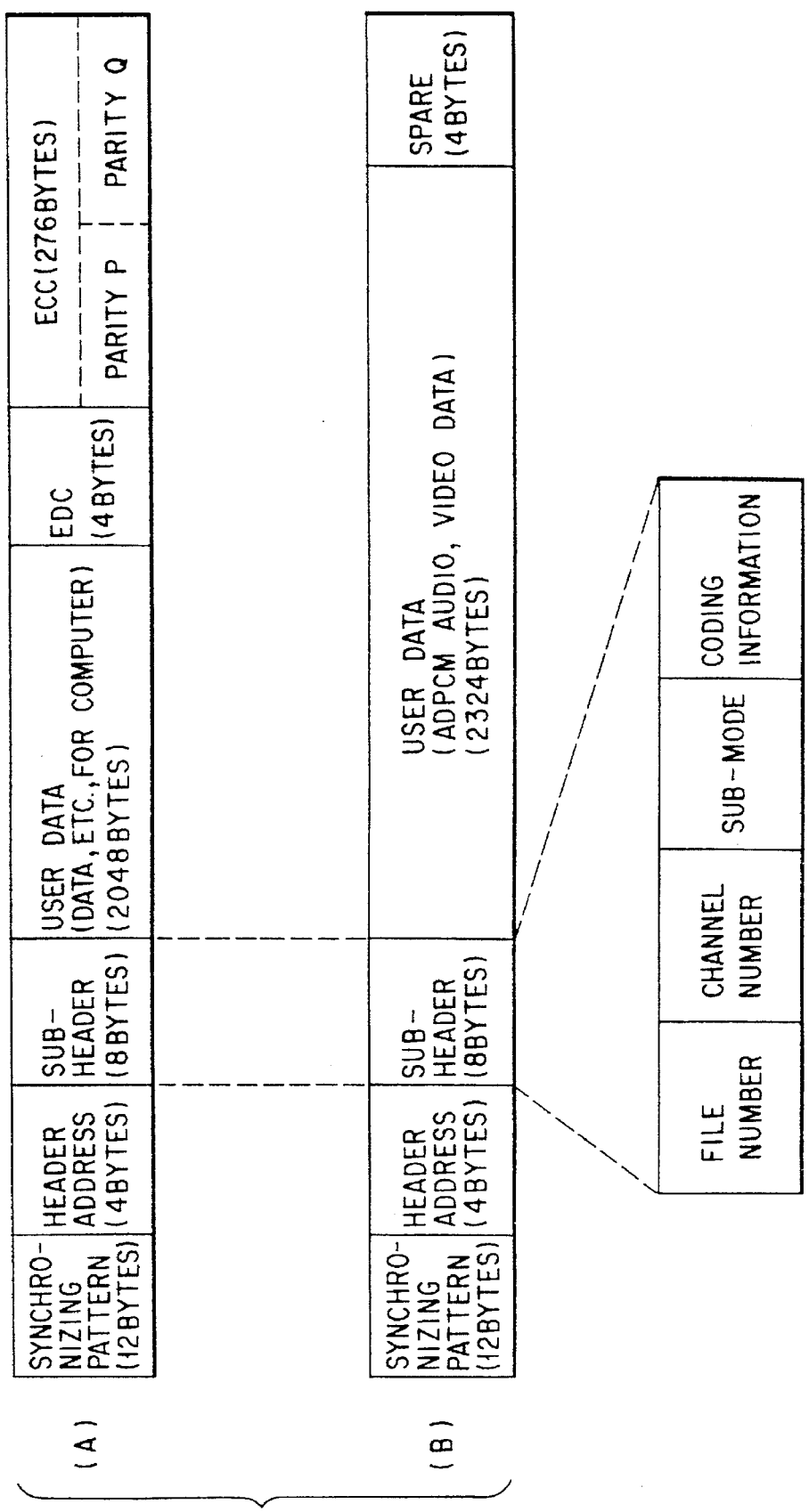
F I G. 2

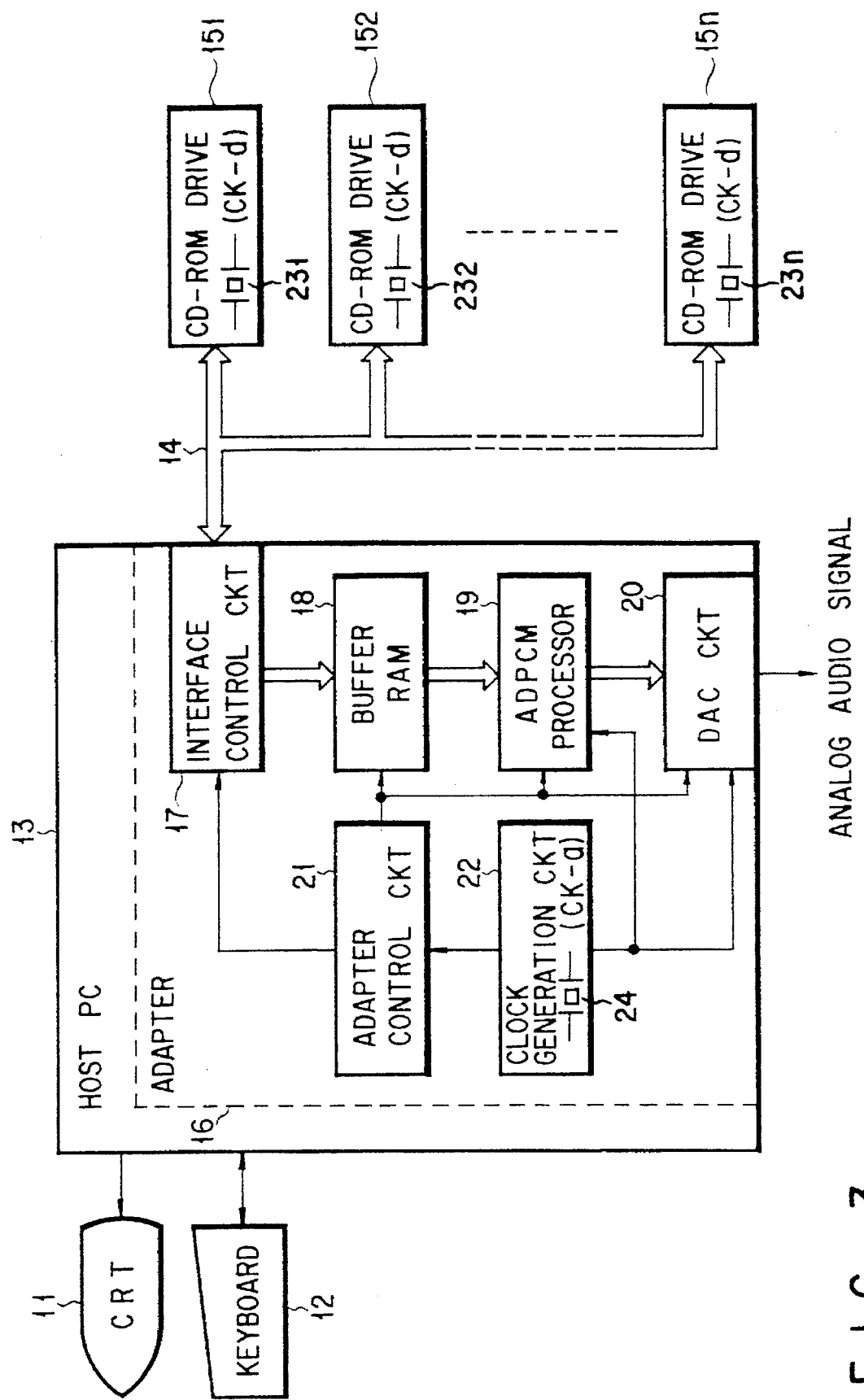
F I G. 3

PROCESSING AND PLAYBACK APPARATUS FOR RECORDED DIGITAL DATA

This is a continuation of application Ser. No. 07/971,961, filed on Apr. 16, 1993, which was abandoned upon the filing hereof.

TECHNICAL FIELD

The present invention relates to a digital data processing apparatus for transferring digital data which is output from a disc reproduction section to a host processing section and for performing processing and, in particular, for achieving synchronization between the data reproduction speed of the disc reproduction section and the data processing speed of the host processing section.

BACKGROUND ART

As known in the art, the CD (compact disc) system currently employed as a main-current acoustic apparatus is of such a type that pits are formed in a 12 cm-diameter disc in a manner to correspond to digital PCM (pulse code modulation) data and reproduction is performed by, while rotating the disc in a drive rotation in a CLV (constant linear velocity) system, linearly tracking the data from an inner periphery side to an outer periphery side on the disc by a semiconductor laser and an optical pickup built in a photoelectric conversion element.

Audio playback musical tone data and sub-code data P, Q, R—W defined for control/display are recorded in the disc. Of the aforementioned data, the sub-code Q is also called as address data and represents, in a program area containing disc's musical tone data, a program number (TNO) of recorded musical tone data, a phrase number (INDEX), a lapse time (TIME) for each program, a total time (ATIME) lapsing from a start position of the program area, etc.

Further, the aforementioned sub-code data Q represents, in a lead-in area located on the inner periphery side of the program area, a start address of each program as TOC (table of contents) data. That is, the sub-code data Q is recorded for implementing a search operation, accurately at high speeds, for selective reproduction of playback data from vast information recorded in the disc to enable a stereo reproduction to be performed for about one hour and for grasping the state of a reproduction on the disc.

The CD system has initially been developed so as to record and reproduce musical data. In recent years, with attention paid to such a vast recording capacity, a CD-ROM (read only memory) system is determined to be used as a read-only data recording medium for the disc through the use of a musical data recording area of the disc as a digital information recording area. The CD-ROM system is of such a type as to record and reproduce digital information on the disc without varying a recording/reproduction format for musical data reproduction in the CD system and to do so by adding a new format thereto.

In the conventional digital data processing system using the CD-ROM system, however, if a clock frequency as a standard of a data processing speed is shifted on the host processing section side and on the disc reproduction section side, then the buffer memory on the host processing section side is placed in an over- or an underflowed state, failing to perform a normal data reproduction and hence involving a problem.

The present invention has been achieved, taking the aforementioned situation into consideration, and the object of the present invention is to provide a highly improved digital data processing apparatus which, even if there is any shift in the frequency of a clock serving as a reference for a data processing speed on the host processing section side and on the disc reproduction section side, prevents the buffer memory on the host processing section side from being placed in an over- or an underflowed state and can perform a normal data reproduction.

DISCLOSURE OF INVENTION

A digital data processing apparatus of the present invention comprises a disc reproduction section for performing a reproduction on a digital data-recorded disc based on a first clock and a host processing section having a memory for storing the digital data output from the disc reproduction section with a speed based on the first clock and for reading the digital data out of the memory based on a second clock and for performing predetermined data processing, characterized in that a range over which the frequency of the first clock is shifted under an ambient condition is set to be higher than a range over which the frequency of the second clock is shifted under the ambient condition and a storage capacity of the memory is set to be greater than a maximum amount of unprocessed data accumulated in the memory which is calculated from the frequency shifts of the first and second clocks and maximum data reproduction time at the disc reproduction section.

That is, the memory is prevented from being placed in an underflowed state by setting the range over which the frequency of the first clock is shifted under the ambient condition to be higher than the range over which the frequency of the second clock is shifted under the ambient condition. Further, by setting the storage capacity of the memory to be greater than a maximum amount of unprocessed data accumulated in the memory which is calculated from the frequency shifts of the first and second clocks and maximum data reproduction time at the disc reproduction section, it is possible to, within the initially set maximum data reproduction time, prevent the memory from being overflowed state and perform a normal data reproduction.

BRIEF DESCRIPTION OF THE DRAWINGS

FIG 1 is a view showing a data format under a CD-ROM system;

FIG. 2 is a view showing a data format under a CD-ROM-XA standard; and

FIG. 3 is a block diagram showing a digital data processing apparatus according to one embodiment of the present invention.

BEST MODE OF CARRYING OUT THE INVENTION

One embodiment of the present invention will be explained below with reference to the accompanying drawings.

First, a CD system enables two-channel analog musical tone signals to be sampled with 44.1 kHz and the resultant signals to be recorded as 16-bit digital musical tone data. On the other hand, a CD-ROM system enables digital data to be recorded with 2352 bytes used as one unit (one block) and, as shown in FIG. 1, with 16 bits divided into 8 bits (1 byte).

As shown in FIG. 1, one block comprises a 12-byte synchronizing pattern a for recognizing the start of the block, a 4-byte header address a showing address information of a block corresponding to the aforementioned sub-code data Q, user data C of 2048 bytes (2 k bytes) for a user and 288 byte error correction data d for error detection and correction.

Out of these, the error correction data d is used in the case where it is not possible to correct errors only by the corrections of C1 and C2 parities for recording/reproduction format in the CD system. The error rate is improved to $10^{-12}$ with the use of the error correction data d. Viewed from the error rate, the CD-ROM system can have adequate performance, in practice, as a data recording medium for a computer.

The aforementioned one block configuration is a format called a "MODE-1" and, in addition to this format, a format called a MODE-2 for recording the user data c is also used on that recording area for error correction data d. In the MODE-2 format, the user data c becomes 2336 bytes.

Here, the data transfer rate in the CD-ROM system is 75 blocks/second and, in the case where data recording is made, for one hour, in the MODE-1 format, then data $$75 \text{ (block/second)} \times 60 \text{ (minutes)} \times 60 \text{ (second)} \times 2 \text{ (k bytes)} = 540M \text{ bytes}$$

is recorded. The amount of data corresponds to 500 sheets of ordinary floppy discs and, if in the document form, to about 300,000 pages.

Further, the CD-ROM system is excellent in its replica capability. That is, the CD-ROM system is the same as the existing CD system in terms of the process of manufacturing discs. The manufacturing cost of the CD-ROM system disc per 1M bytes is far lower than that of the floppy disc per 1M bytes and this is very suitable for duplicating the same documents and data.

That is, among those existing record/reproduction systems using discs, the CD-ROM system realizes a record/reproduction system of a large recording capacity capable of a ready duplication at a lower error rate.

In recent times, the CD-ROM·XA (extended architecture) standard has been offered as an extended standard for the CD-ROM system. The CD-ROM·XA standard regulates those formats of image data recorded on the disc and compressed audio data (ADPCM system). That is, the data of the CD-ROM·XA standard is stored in the block for the aforementioned MODE-2 format and two forms are determined as shown in FIGS. 2A and 2B.

Audio data is recorded, in an interleaved fashion, with the ADPCM system. For the sampling frequency 44.1 kHz of the CD system, a 37.8 kHz level B and 18.9 kHz level C are defined and the compression ratio is 4-fold at the level B (stereo) and 16-fold at the level C (monaural). For the monaural audio data, therefore, it is possible to record data corresponding to 16 hours on one disc.

A file number and channel number defined in a subheader, if being used, enable recording to be made in a complex interleaving fashion, for example, a Japanese language to be recorded on a channel No. 1 and an English narration to be recorded on a channel No. 2, and enable these to be momentarily switched for reproduction. Further, audio and video data can be recorded in an interleaved fashion and, with the video data record on a channel No. 1 and the audio data on a channel No. 2, the audio data can be recorded while, at the same time, the video data is read out.

In the CD-ROM system, video data is recorded on a data track and audio data is recorded on an audio track of a disc. Audio/video synchronization is achieved through repeated access to both the data. In the CD-ROM·XA standard, the switching of languages, as well as the simultaneous display of images, can be achieved, in real time, without involving an access operation. Although being somewhat degenerated in quality of sound as set out above, long-duration audio data can be recorded, one greater advantage which Is obtained from the CD-ROM·XA standard.

A CD-ROM drive for reproduction on a CD-ROM disc contains a DAC (digital-to-analog converter) circuit and audio data on the CD system disc is subjected, by a command of a host PC (personal computer), to processing in the CD-ROM drive to obtain an analog audio signal for an audio performance to be carried out.

At the present time, however, as shown in FIG. 3, a digital data processing system is considered according to which a CRT (cathode ray tube) 11 for display and keyboard 12 for an operation are connected to a host PC 13, a plurality of CD-ROM drives $15_1, 15_2, \ldots, 15_n$ are connected to the PC 13 via an interface 14, such as an SCSI (small computer system interface) bus, and those digital audio data items selectively obtained from the respective CD-ROM drives $15_1, 15_2, \ldots, 15_n$ prior to being converted by a DAC circuit to analog ones are transferred via the interface 14 to the host PC 13 where the digital audio data items are subjected, by an adapter 16, to processing to obtain an analog audio signal for an audio performance to be carried out.

In this case, the adapter 16 comprises an interface control circuit 17 connected to the aforementioned interface 14, a buffer RAM (random access memory) 18 for temporarily storing the digital audio data output from the interface control circuit 17, an ADPCM processor 19 for subjecting the audio data which is read out of the buffer RAM 18 to expansion processing in the case of the CD-ROM·XA standard, a DAC circuit 20 for converting the audio data which is output from the ADPCM processor to an analog audio signal, an adapter control circuit 21 for controlling a series of operations of the interface control circuit 17, buffer RAM 18, ADPCM processor 19 and DAC circuit 20, and a clock generation circuit 22 for generating clocks necessary for, and supplying them to, the adapter control circuit 21, ADPCM processor 19 and DAC circuit 20.

According to the aforementioned digital data processing system, since a DAC circuit is not required in the respective CD-ROM drives $15_1, 15_2, \ldots, 15_n$, it is possible to employ those CD-ROM drives with a DAC circuit eliminated. As means for achieving the CD-ROM·XA standard, two systems are considered, one system containing a demodulation circuit for the CD-ROM drive and the other system providing an adapter to a host PC and adapted to process data, through the adapter, which is transferred via an interface from a corresponding CD-ROM. For the time being it is predicted that a main current will be toward the latter's system.

If, in this case, an adapter is designated with not only a demodulation circuit for the CD-ROM·XA but also an audio data transfer circuit being added thereto, then it is possible to structure an efficient system as a simpler compact unit. A plurality of CD-ROM drives can be connected to an ordinary interface in which case it is only necessary to provide a single demodulation circuit. This adapter system involves an greater advantage.

The sampling frequency of the CD system is 44.1 kHz and is generated usually through the frequency division of 16.9344 MHz, that is, $16.9344 \text{ MHz} \times (\frac{1}{4}) \times (\frac{1}{3}) \times (\frac{1}{32}) = 44.1$ kHz. The CD-ROM drive usually contains a 16.9344 MHz crystal oscillator and frequency division circuit.

Further, it is required that, even in the digital data processing system shown in FIG. 3, a similar circuit be arranged in the adapter 16 because even demodulation processing in the adapter 16 is implemented with the same sampling frequency 44.1 kHz as set out above. This is a requisite rule for the data reproduction not only for the CD-ROM system but also under the CD-ROM·XA standard.

In the digital data processing system shown in FIG. 3, the commonest arrangement relating to clocks is such that a separate crystal oscillator of a fixed frequency is provided for the respective CD-ROM drives $15_1$, $15_2$, ..., $15_n$ and adapter 16. In order to obtain the same frequency, in this case, at the respective CD-ROM drives $15_1$, $15_2$, ..., $15_n$ and at adapter 16, use is naturally made of crystal oscillators of the same nominal frequency.

However, there is no possibility that both the oscillation frequencies will coincide with each other completely at all times. This is because the oscillation frequency varies due to the accuracy, aging, ambient temperature, etc., of the crystal oscillators. According to, for example, an ordinary crystal oscillator specification, the allowable frequency deviation is within ±20 ppm/25° C.±3° C. and frequency temperature deviation is within ±30 ppm/−20° C.−+60° C. and both the deviations, being simply added together, become ±50 ppm (±0.005%). That is, even if the crystal oscillator of the aforementioned specification is applied to both the CD-ROM drive and adapter, the maximum frequency deviation occurring between the two becomes $$50 \times 2 = 100 \text{ ppm } (0.01\%).$$

Stated in connection with the digital data processing system shown in FIG. 3, if the audio data, for example, is processed, a whole system of those CD-ROM drives $15_1$, $15_2$, ..., $15_n$ calling for a reproduction operation is operated based on a reference clock CK-d generated therein and, with that frequency, the audio data is reproduced from the disc. The reproduced audio data is temporarily stored in the buffer RAM 18 via the interface 14 and interface control circuit 17 in the adapter 16. Thereafter, the audio data stored in the buffer RAM 18 is sequentially read out of the buffer RAM 18 based on the adapter reference clock CK-a generated from the clock generation circuit 22 and is converted by the DAC circuit 20 to an analog audio signal.

In the case where the frequencies of the two clocks CK-d and CK-a are entirely equal to each other, the input of the audio data into the buffer RAM 18 in the adapter 16 and output of the audio data from the buffer RAM 18 are processed with entirely the same speed and, therefore, no audio data is basically stored in the buffer RAM 18, ensuring a continuous audio performance without involving any problem.

If, on the other hand, the reference clock CK-d of the CD-ROM drive $15_1$, $15_2$, ..., or $15_n$ is shifted by +0.005% and the adapter reference clock CK-a from the clock generation circuit 22 is shifted by −0.005%, then the speed with which audio data is input to the buffer RAM 18 is 0.01% faster than the speed with the audio data is output from the buffer RAM 18 and hence unprocessed audio data is little by little stored in the buffer RAM 18.

That is, since the reproduction rate of the audio data in the CD-ROM system is 176400 bytes/sec., the 17.64 byte/sec. audio data is accumulated in the buffer RAM 18 and, after two minutes, audio data of 17.64×120 seconds=2117 bytes will be accumulated. If, therefore, a 2 k byte (2048 bytes) -element is adopted as RAM 18, the buffer RAM 18 will be placed in an overflowed state after two minutes, that is, in a state in which there is no area into which new audio data is written.

In order to cope with this state, an overwrite means for overwriting newly reproduced audio data onto that unprocessed audio data written into the buffer RAM 18 and means for discarding newly reproduced audio data without writing it into the buffer RAM 18 and for continuing processing the unprocessed audio data are considered. In either case, however, the dropout of the audio data occurs. In the former case, there occurs an error in the order of reproduction and in the latter case there occurs a skip in a reproduced audio tone. In either case, it is impossible to perform a continuous and uninterrupted audio performance.

If, on the other hand, the reference clock CK-d of the CD-ROM drive $15_1$, $15_2$, .... or $15_n$ is shifted by −0.005% and the adapter reference clock Ck-a generated from the clock generation circuit 22 is shifted by +0.005%, the speed with which audio data is output from the buffer RAM 18 is 0.01% faster than the speed with which audio data is input to the buffer RAM 18. Therefore, an underflow state occurs in the buffer RAM 18 and, even if the audio data is attempted to be read out of the buffer RAM 18 on the basis of the adapter reference clock CK-a, the buffer RAM 18 is placed in a state in which there is no audio data at all. It is thus not possible to perform a normal audio performance.

Since the aforementioned two cases are determined by the ambient temperature, etc., involved, it is not possible, in practice, to initially predict which state occurs and to cope with this state. It may be considered that, as the means for solving the problem, a dedicated synchronous signal line is provided between the respective CD-ROM drives $15_1$, $15_2$, ..., $15_n$ and the adapter 16 to achieve synchronization of both. However, adding a specific line to a standard interface connector is not desirable from the standpoint of its general purpose and economy.

According to the present invention, for those crystal oscillators $23_1$, $23_2$, ..., $23_n$ for generating a reference clock CK-d in the CD-ROM drives $15_1$, $15_2$, ..., $15_n$ and the crystal oscillator 24 for generating the adapter reference clock CK-a in the clock generation circuit 22 of the adapter 16, a different nominal frequency one is employed and, even if consideration is paid to the shift of the oscillation frequency resulting from the ambient temperature, etc., in the crystal oscillators $23_1$, $23_2$, ..., $23_n$ and 24, the frequency of the reference clock CK-d is set to be normally higher than that of the adapter reference clock CK-a.

If, as the crystal oscillator 24 for instance, use is made of one having an oscillation frequency of 16.9344 MHz and a shift of 50 ppm and this oscillation frequency is subjected to a frequency division $(\frac{1}{4}) \times (\frac{1}{3}) \times (\frac{1}{32})$ as set out above to generate an adapter reference clock CK-a, then the frequency range becomes $$44.1 \times 99.995\% - 44.1 \times 100.005\% = 44.0978 \text{ kHz} - 44.1022 \text{ kHz}.$$

If, on the other hand, as the crystal oscillators $23_1$, $23_2$, ..., $23_n$, use is made of ones having an oscillation frequency of 16.9362 MHz and a shift of 50 ppm, the reference clock CK-d obtained through the frequency division of this oscillation frequency as set out above has a frequency range of 44.1025 kHz–44.1069 kHz. This minimum frequency (44.1025 kHz) exceeds the maximum frequency (44.1022 kHz) of the adapter reference clock CK-a and, irrespective of a temperature, etc., involved, a relation $$CK\text{-}d > CK\text{-}a$$

is established at all times.

By establishing such a relation as to exceed the frequency of the reference clock CK-d on the CD-ROM drives $15_1$, $15_2$, ..., $15_n$ side over the frequency of the adapter reference clock CK-a on the adapter 16 side at all times, the speed with which the audio data is input to the buffer RAM 18 exceeds, at all times, the speed with which the audio data is output from the buffer RAM 18. Therefore, the unprocessed audio data is sequentially accumulated in the buffer RAM 18 and that operation is toward an overflowing direction, but there never occurs any underflowed state, that is, another abnormal state.

In this case, the accumulation rate of the unprocessed data in the buffer RAM 18 becomes maximal in the case where the reference block CK-d on the CD-ROM drives $15_1$, $15_2$, ..., $15_n$ is shifted toward the maximum direction and adapter reference clock CK-a on the adapter 16 side is shifted to the minimum direction. Stated in connection with the aforementioned example, the maximum deviation between the reference clock CK-d and the adapter reference clock CK-a becomes $$0.005 \times 2 + 0.005 \times 2 = 0.02\%.$$

Since, as set out above, the data reproduction rate of the CD-ROM system and CD-ROM·XA standard is 176400 bytes/second, the maximum data accumulation rate to the buffer RAM 18 becomes $176400 \times 0.02\% = 35.28$ bytes/second. Needless to say, the minimum data accumulation rate to the buffer RAM 18 becomes zero when the frequency of the reference clock CK-d and that of the adapter reference clock CK-a become equal to each other.

Here, if the reproduction of the audio data for instance is continued for one hour, then an amount of data accumulated in the buffer RAM 18 after one hour becomes $35.28 \times 60 \times 60 = 127008$ bytes. If, therefore, as the buffer RAM 18, use is made of one having a memory capacity, for example, 128 k bytes (131072 bytes), exceeding the amount of accumulated data as set out above, it is possible to prevent an overflowed state and underflowed state in the buffer RAM 18 upon data reproduction for one hour at the lowest.

Needless to say, the capacity of the buffer RAM 18 varies due to the accuracy (allowable deviation) of the crystal oscillation, continuous data reproduction time, etc. If data reproduction is carried out for 30 minutes at max. with the use of a crystal oscillator having a deviation of, for example, 25 ppm, then the storage capacity of the buffer RAM 18 may become $127008 \times (\frac{1}{2}) \times (\frac{1}{2}) = 31752$ bytes, thus making it possible to use a 32 k byte RAM.

Although explanation has been made about the worst case where the reference clock CK-d undergoes a maximum shift and the adapter reference clock CK-a undergoes a minimum shift, since, in actual practice, the CD-ROM drives $15_1$, $15_2$, ..., $15_n$ and host PC 13 are employed under substantially the same circumstance (ambient temperature, etc.), it is predicted that the shift of the crystal oscillators $23_1$, $23_2$, ..., $23_n$ are in the same direction. Taking the above into consideration, a buffer RAM of a small storage capacity can be employed as the buffer RAM 18.

According to the aforementioned embodiment, therefore, a relation is created in which the frequency of the reference clock CK-d in the CD-ROM drives $15_1$, $15_2$, ..., $15_n$ exceeds, at all times, the frequency of the adapter reference clock CK-a on the host PC 13 side. Further, the buffer RAM 18 is provided which has a storage capacity exceeding a maximum data accumulation amount calculated from the deviations of the two clocks CK-d and CK-a and maximum data reproduction time. Even if the frequencies of the clock CK-d and CK-a are shifted, the buffer RAM 18 is prevented from being placed in an over- or an underflowed state and it is possible to perform a normal data reproduction.

Although, in the aforementioned embodiment, the crystal oscillators $23_1$, $23_2$, ..., $23_n$ of the CD-ROM drives $15_1$, $15_2$, ..., $15_n$ and the crystal oscillator 24 of the host PC 13 have been explained as having respective different nominal frequencies, it is needless to say that a relation CK-d>CK-a may be established by varying the frequency division ratio of the outputs of those crystal oscillators of the same nominal frequencies.

The present invention is not restricted to the aforementioned embodiment and various changes or modifications of the present invention can be made without departing from the spirit and scope of the present invention.

Industrial Applicability

According to the present invention as set out above, a highly improved digital data processing apparatus is provided which, even if there is a shift in the frequency of a clock providing a reference for the data processing speed on the host processing side and disc reproduction section side, prevents the buffer memory on the host processing section side from being placed in an over- or an underflowed state and can perform a normal data reproduction.

I claim:

1. A digital data processing apparatus comprising:

a disc reproduction section which reproduces digital data from a digital data-recorded disc based on a first clock, the disc reproduction section having a first clock generating means for generating the first clock based on a first crystal oscillator, the first clock having a minimum frequency corresponding to a deviation of the first crystal oscillator during an ambient condition; and a host processing section having:

a second clock generating means for generating a second clock based on a second crystal oscillator, the second clock having a maximum frequency corresponding to a deviation of the second crystal oscillator during the ambient condition, a memory into which the digital data output from the disc reproduction section is stored at a rate based on the first clock and from which the digital data is read at a rate based on the second clock, and a processor which performs predetermined data processing, the minimum frequency of the first clock during the ambient condition being higher than the maximum frequency of the second clock during the ambient condition, and a storage capacity of the memory being greater than a maximum amount of unprocessed data accumulated in the memory which corresponds to a maximum difference between the first and second clocks and a maximum data reproduction time at the disc reproduction section.

2. The digital data processing apparatus according to claim 1, wherein the first and second crystal oscillators have the same nominal frequency.

3. The digital data processing apparatus according to claim 1, characterized in that said disc reproduction section is comprised of a plurality of CD-ROM drives connected via an interface to said host processing section.

4. The digital data processing apparatus according to claim 3, characterized in that said host processing section has expanding means which, when the digital data read out of the memory is under a CD-ROM·XA standard, subjects said digital data to expansion processing.

5. The digital data processing apparatus according to claim 1, characterized in that said host processing section has means for converting the digital data which is read out of the memory to an analog signal.

6. The digital data processing apparatus according to claim 1, characterized in that said host processing section is comprised of a host personal computer to which display means and operation means are connected.

* * * * *